(12) United States Patent
Rowe

(10) Patent No.: US 8,056,781 B1
(45) Date of Patent: Nov. 15, 2011

(54) GOLF ASSIST SYSTEMS

(76) Inventor: Darryl K. Rowe, Peoria, AZ (US)

( * ) Notice: Subject to any disclaimer, the term of this patent is extended or adjusted under 35 U.S.C. 154(b) by 1114 days.

(21) Appl. No.: 11/845,393

(22) Filed: Aug. 27, 2007

Related U.S. Application Data

(60) Provisional application No. 60/823,623, filed on Aug. 25, 2006.

(51) Int. Cl.
*A45F 3/14* (2006.01)

(52) U.S. Cl. ........ 224/184; 224/575; 224/576; 224/665; 280/1.5

(58) Field of Classification Search ........... 224/575, 224/576, 665, 184; 280/1.5, 18, 19, 47.17; 119/770, 792, 795
See application file for complete search history.

(56) References Cited

U.S. PATENT DOCUMENTS

| | | | |
|---|---|---|---|
| 2,559,981 A | 7/1951 | McBride | |
| 2,931,629 A | 4/1960 | Keller | |
| 2,996,228 A * | 8/1961 | Bauman | 224/184 |
| 3,311,385 A | 3/1967 | Frantz | |
| 3,328,043 A | 6/1967 | Johnson | |
| 4,243,164 A * | 1/1981 | Burlison et al. | 294/146 |
| 4,396,091 A * | 8/1983 | Anderson | 182/3 |
| 4,957,231 A * | 9/1990 | Kalisher | 224/583 |
| 5,215,318 A | 6/1993 | Capraro | |
| 5,244,217 A | 9/1993 | Kotulla | |
| 5,265,891 A | 11/1993 | Diehl | |
| D367,142 S * | 2/1996 | Platt | D34/27 |
| 5,622,294 A | 4/1997 | Evans | |
| 6,027,001 A | 2/2000 | Levitan | |
| 6,131,917 A | 10/2000 | Walsh | |
| 6,431,556 B1 | 8/2002 | Beardsley et al. | |
| 6,883,691 B2 | 4/2005 | Pratt et al. | |
| 6,978,485 B2 | 12/2005 | Stude | |
| 2003/0209579 A1 | 11/2003 | Postel | |
| 2004/0016781 A1* | 1/2004 | Smith | 224/184 |
| 2006/0151963 A1* | 7/2006 | Epley | 280/1.5 |

* cited by examiner

*Primary Examiner* — Nathan J Newhouse
*Assistant Examiner* — Steven M Landolfi, Jr.

(57) ABSTRACT

A system for efficient manual towing of a wheeled golf trolley using a flexible tether and harness mountable to the torso of a user.

19 Claims, 7 Drawing Sheets

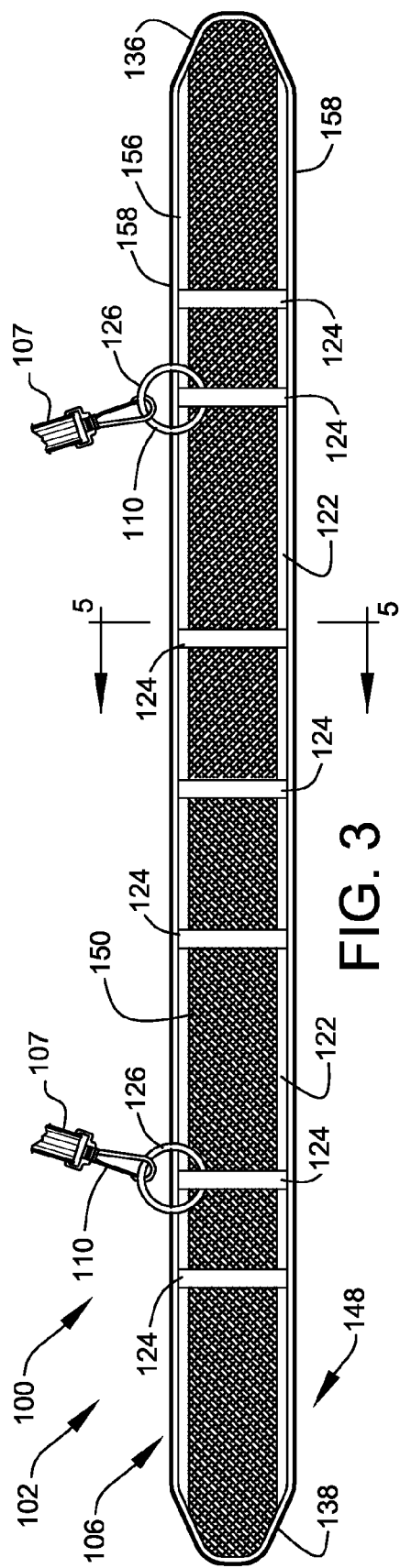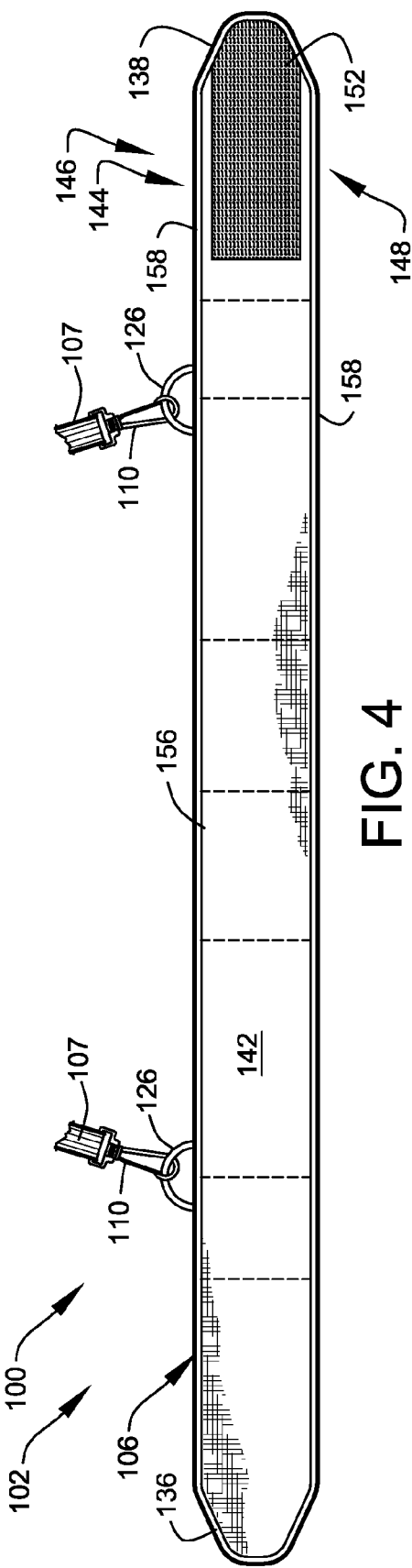

GOLF ASSIST SYSTEMS

CROSS-REFERENCE TO RELATED APPLICATION

The present application is related to and claims priority from prior provisional application Ser. No. 60/823,623, filed Aug. 25, 2006, entitled "GOLF ASSIST SYSTEMS", the content of which is incorporated herein by this reference and are not admitted to be prior art with respect to the present invention by the mention in this cross-reference section.

BACKGROUND

This invention relates to systems assisting an individual in the transport of golf-related equipment. More particularly this invention relates to providing a system for efficient manual towing of a wheeled golf trolley using the torso of a golfer or golf caddy.

The sport of golf typically requires a golfer to transport his or her equipment across the length of the course on which the sport is played. A typical golf course may comprise up to eighteen holes of play (a hole is generally defined as a section of the course between a tee, where a ball is first hit, to a physical hole in which the ball is eventually placed) and may comprise an overall length exceeding 7500 yards. Traditionally, a golfer will carry a number of golf clubs to execute play. These clubs are generally grouped within a golf bag which, when fully loaded, comprises a considerable weight.

Many golfers find the manual transport of their equipment across eighteen holes of play both tiring and ultimately detrimental to their overall performance. For example, the accuracy and power of a player's drive is directly impacted by a player's level of muscle fatigue. Similarly, a player's short game (putting the ball across a green into the hole) is especially affected by arm fatigue. A golfer seeking to reduce the load by employing a manually pulled golf cart or similar trolley may experience continued levels of arm fatigue as the pulling and twisting force applied to the player's body causes the player's arms to tire, especially during the towing or pushing of the equipment between the ending holes of a course. Clearly, needs exists for efficient and economical systems for reducing the stress and fatigue a player experiences during the manual transport of golf equipment during play.

OBJECTS AND FEATURES OF THE INVENTION

A primary object and feature of the present invention is to provide systems to overcome the above-described problems.

Another primary object and feature of the present invention is to provide a system for improved manual transport of golf equipment during the course of play.

It is a further object and feature of the present invention to provide such a system that allows a golf trolley to be towed without significant effort by the user's arms.

It is another object and feature of the present invention to provide such a system that supports a range of attachable accessories.

It is a further object and feature of the present invention to provide such a system that is adaptable to both large and small users.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system related to towing at least one golf bag adapted to hold golf equipment comprising at least one golf club using the torso of at least one user comprising: at least one wheeled golf trolley adapted to assist wheeled transport of the at least one golf bag; at least one torso support structured and arranged to support at least one force-generated load on the torso of the at least one user; at least one tether structured and arranged to tether at such at least one wheeled golf trolley to such at least one torso support; and at least one proximal removable coupler structured and arranged to removably couple such at least one tether to such at least one torso support; wherein such at least one tether is structured and arranged to transfer at least one tensional force between such at least one wheeled golf trolley and such at least one torso support; wherein such at least one torso support comprises at least one load distributor structured and arranged to distribute the at least one force-generated load along at least one waist portion of the torso of the at least one user; and wherein such at least one load transfer tether is sufficiently flexible to limit substantially all transfers of compressive loads such at least one wheeled golf trolley and such at least one torso support.

Moreover, it provides such a system wherein such at least one tether comprises at least one removable tether coupler structured and arranged to removably couple such at least one load transfer tether to such at least one wheeled golf trolley. Additionally, it provides such a system wherein such at least one tether comprises at least three distal removable couplers structured and arranged to removably couple such at least one load transfer tether to at least three points on such at least one wheeled golf trolley. Also, it provides such a system wherein such at least one removable tether coupler comprises at least one carabiner-type device.

In addition, it provides such a system wherein such at least one tether comprises at least one substantially flexible strap. And, it provides such a system wherein such at least one substantially flexible strap comprises: at least one length; and at least one strap-length adjuster structured and arranged to adjust such at least one length; wherein such at least one strap-length adjuster adjustable by the at least one user. Further, it provides such a system wherein such at least one first removable coupler comprises at least one swivel structured and arranged to provide substantially unencumbered swiveling of such at least one load transfer tether relative to such at least one torso support.

Even further, it provides such a system wherein such at least one load distributor comprises at least one encircling belt structured and arranged to encircle substantially a full circumference of the at least one waist portion of the torso of the at least one user. Moreover, it provides such a system wherein such at least one encircling belt comprises: at least one first end at least one second end at least one outer face; at least one inner face; and at least one coupler structured and arranged to releasably couple such at least one first end to such at least one second end.

Additionally, it provides such a system wherein such at least one encircling belt comprises at least one belt-size adjuster structured and arranged to adjust the circumferential size of such at least one encircling belt. Also, it provides such a system wherein: both such at least one coupler and such at least one belt-size adjuster each comprise at least one hook-and-loop type fastener; such at least one hook-and-loop type fastener comprises at least one first mating portion and at least one second mating portion; and such at least one first mating portion and such at least one second mating portion are structured and arranged to form at least one releasable engagement.

In addition, it provides such a system wherein: such at least one outer face comprises such at least one first mating portion; such at least one inner face comprises such at least one second mating portion; such at least one second mating portion is position substantially adjacent at least one of such at least one first end and such at least one second end. And, it provides such a system wherein such at least one first mating portion extends along substantially the entire length of such at least one outer face.

Further, it provides such a system wherein such at least one outer face comprises at least one fixed loop structured and arranged to receive and firmly retain such at least one proximal removable coupler. Even further, it provides such a system wherein: such at least one inner face comprises at least one padding structured and arranged to provide padded contact adjacent the at least one waist portion of the torso of the at least one user. Moreover, it provides such a system wherein such at least one load distributor comprises at least one shoulder strap structured and arranged to further distribute the at least one force-generated load along at least one shoulder portion of the torso of the at least one user.

Additionally, it provides such a system wherein such at least one shoulder strap comprises at least one removable harness-coupler structured and arranged to removably couple to such at least one encircling belt. Also, it provides such a system wherein: such at least one shoulder strap comprises such at least one proximal removable coupler; and the at least one tensional force transferred by such at least one tether is applied to such at least one torso support substantially at such at least one proximal removable coupler of such at least one shoulder strap. In addition, it provides such a system further comprising: at least one attachable accessory structured and arranged to removeably attach to such at least one torso support.

And, it provides such a system wherein: both such at least one torso support and such at least one attachable accessory comprise at least one hook-and-loop type fastener; such at least one hook-and-loop type fastener comprises at least one first mating portion and at least one second mating portion; and such at least one torso support comprises such at least one first mating portion; such at least one attachable accessory comprises such at least one second mating portion; and such at least one first mating portion and such at least one second mating portion are structured and arranged to form at least one releasable engagement. Further, it provides such a system wherein such at least one attachable accessory comprises at least one member selected from the group consisting essentially of: beverage holders, storage compartments golf equipment holders, wireless communication holsters.

Even further, it provides such a system wherein: during upright walking use of such system by the at least one user, such at least one torso support is structured and arranged to position such at least one proximal removable coupler at a first elevation within at least one elevational range; the highest point of coupling between such at least one removable tether coupler and such at least one wheeled golf trolley comprises a second elevation; and such first elevation is at least greater than such second elevation.

In accordance with another preferred embodiment hereof, this invention provides a method related to towing of at least one wheeled golf trolley using the torso of at least one user comprising the steps of: mounting on the torso of the at least one user, at least one torso support structured and arranged to support at least one force-generated load, wherein such at least one torso support comprises at least one encircler structured and arranged to encircle at least one waist portion of the torso; removably coupling at least one flexible load transfer member to such at least one torso support; and removably coupling the at least one flexible load transfer member to the at least one wheeled golf trolley.

In accordance with another preferred embodiment hereof, this invention provides a system related to towing of at least one wheeled golf trolley using the torso of at least one user comprising: at least one torso support structured and arranged to support at least one force-generated load on the torso of the at least one user; at least one tether structured and arranged to transfer at least one tensional force between the at least one wheeled golf trolley and such at least one torso support; and at least one proximal removable coupler structured and arranged to removably couple such at least one load transfer tether to such at least one torso support; wherein such at least one torso support comprises at least one load distributor structured and arranged to distribute the at least one force-generated load along at least one waist portion of the torso of the at least one user; and wherein such at least one load transfer tether is sufficiently flexible to limit substantially all transfers of compressive loads such at least one wheeled golf trolley and such at least one torso support. Even further, it provides such a system wherein: such at least one tether comprises at least three distal removable couplers structured and arranged to removably couple such at least one load transfer tether to at least three points on the at least one wheeled golf trolley; and each one of such at least three distal removable couplers is structured and arranged to be positionally adjustable along substantially the entire length of such at least one tether. In addition, it provides each and every novel feature, element, combination, step and/or method disclosed or suggested by this patent application.

BRIEF DESCRIPTION OF THE DRAWINGS

FIG. 3 shows a front view of a waist belt of the golf-assist harness of FIG. 1.

FIG. 4 shows a back view of a waist belt of the golf-assist harness of FIG. 1.

DETAILED DESCRIPTION OF THE BEST MODES AND PREFERRED EMBODIMENTS OF THE INVENTION

Figure 1:
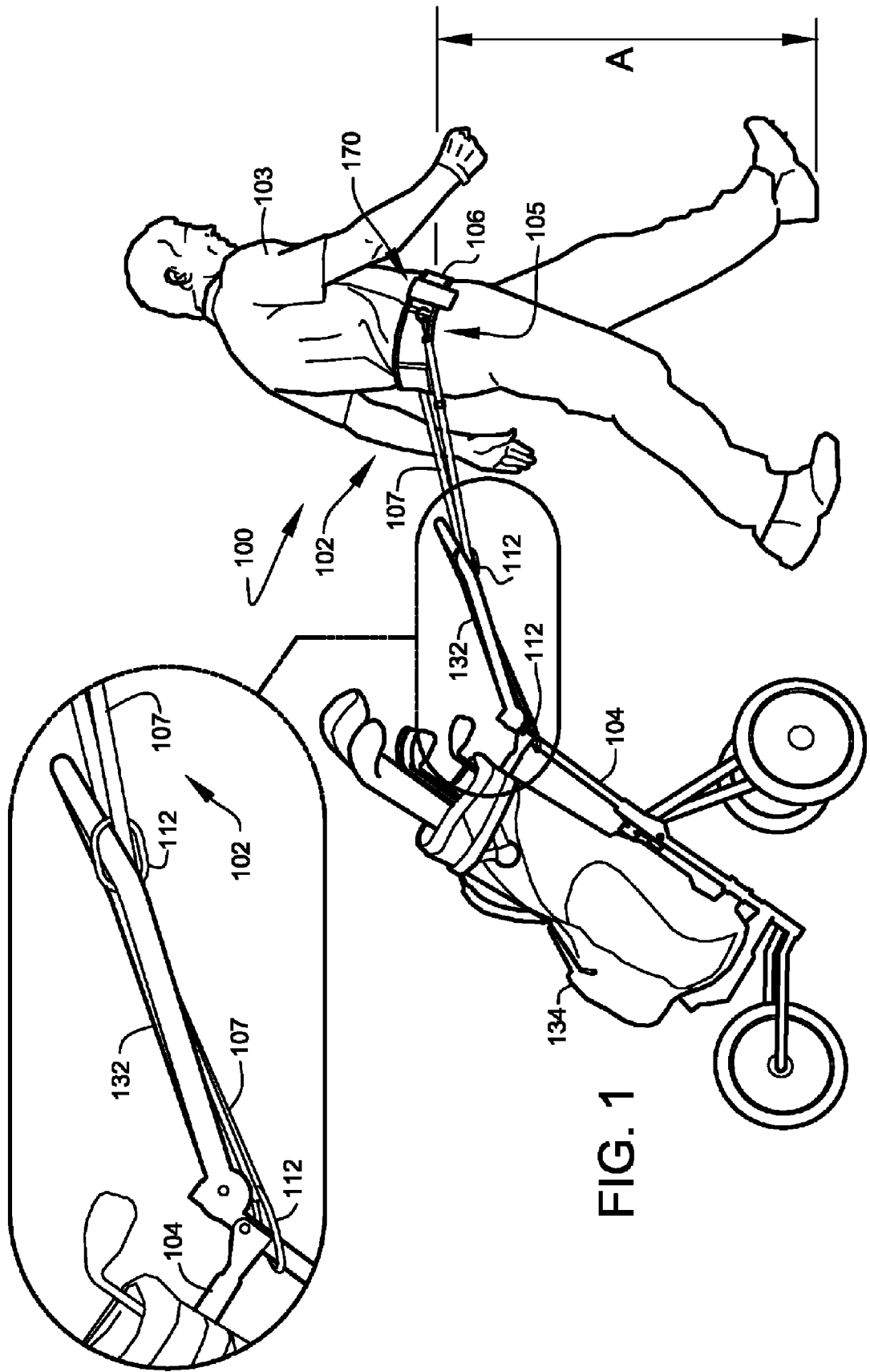
FIG. 1 shows a perspective view illustrating a golfer pulling a golf trolley using a golf-assist harness of a golf-assist system according to a preferred embodiment of the present invention.

FIG. 1 shows a perspective view illustrating user 103 (typically a golfer) pulling golf trolley 104 using golf-assist harness 102 of golf-assist system 100, according to a preferred embodiment of the present invention. Preferably, golf-assist system 100 assists in reducing muscle fatigue by removing the user's arms from the process of manually pulling golf trolley 104. In addition, golf-assist system 100 preferably provides user 103 the freedom to use both hands while the golf trolley 104 is towed between holes.

Preferably, golf-assist system 100 is designed to be used with a self-supporting (three wheeled) golf trolley 104, as shown. In the present disclosure, the term "golf trolley" shall include golf devices also identified in the art as golf carts, bag carts, pull carts, and pushcarts. Golf trolley 104 preferably comprises a design substantially matching that of a Sun Mountain (push-type) speed golf cart produced by Sun Mountain Sports (URL www.sunmountain.com).

Golf-assist system 100 is preferably designed so that user 103 is not required to support the full portion of the weight of the cart and bag. More specifically, golf-assist system 100 is preferably designed so that when user 103 is in a stationary position, no bag or cart weight is applied to the body of user 103 (assuming the cart is resting on a substantially horizontal surface).

Figure 2:
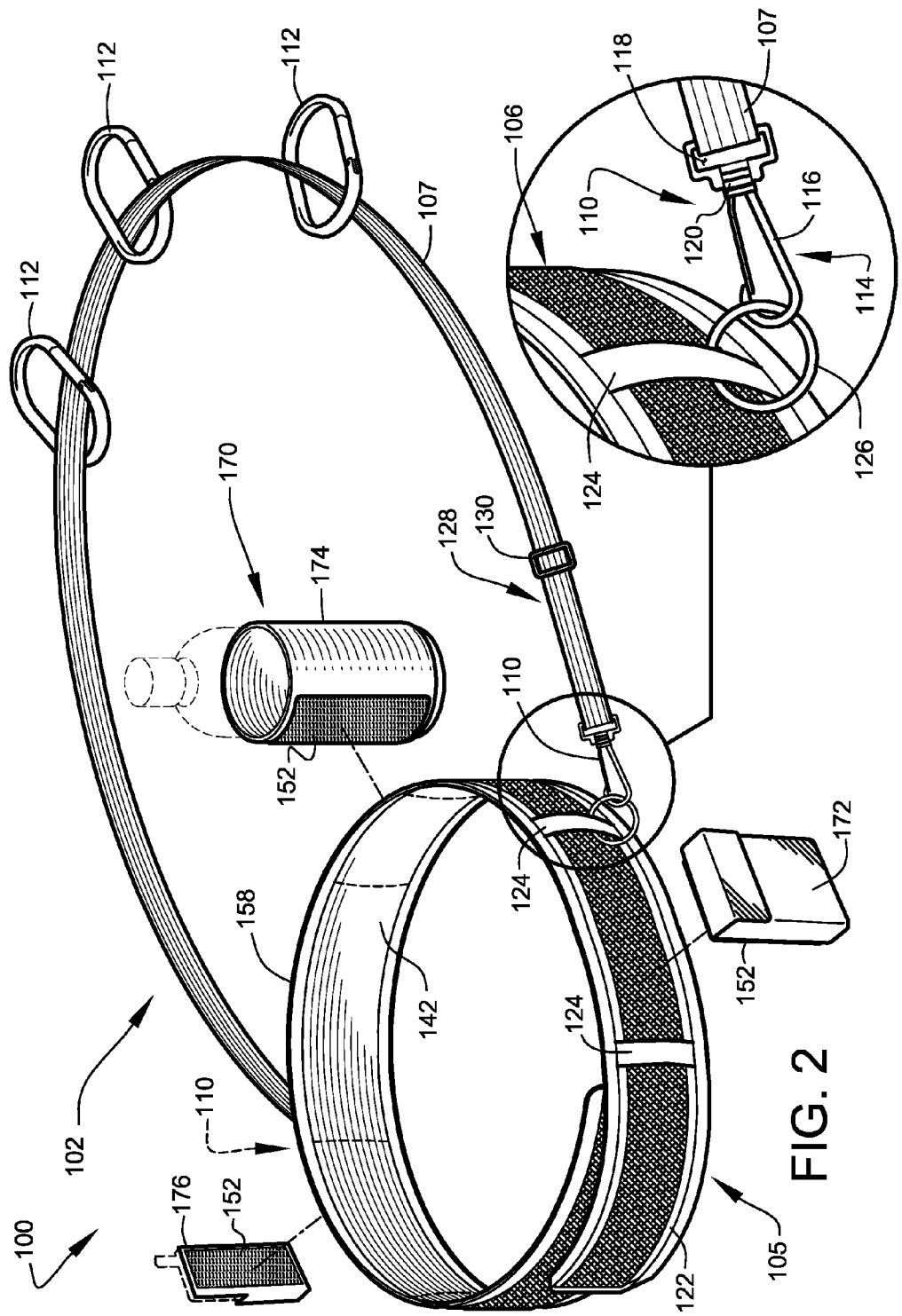
FIG. 2 shows a perspective view of the golf-assist harness of FIG. 1.

FIG. 2 shows a perspective view of golf-assist harness 102 of FIG. 1. Preferably, golf-assist harness 102 comprises at least one torso support 105 adapted to support at least one force-generated load on the torso of user 103, as shown in FIG. 1. In the preferred embodiment of FIG. 1, torso support 105 comprises waist belt 106, as shown.

Golf-assist harness 102 further preferably comprises at least one tether 107 adapted to transfer at least one tensional force between golf trolley 104 and waist belt 106, as shown in FIG. 1. Tether 107 preferably comprises a length of webbing, most preferably flat nylon webbing, as shown. Preferably, tether 107 comprises a single continuous length of flat nylon webbing, as shown. Preferably, tether 107 exhibits limited elongation under load.

Preferably, each end of tether is equipped with a tether-to-belt coupler 110 (one of two is visible in FIG. 2). Preferably, each tether-to-belt coupler 110 provides a convenient means for coupling and decoupling tether 107 to waist belt 106. Preferably, tether-to-belt coupler 110 comprises a detachable snap hook 114 having a gated hook portion 116 permanently coupled to webbing aperture 118 by swivel 120, as best shown in the enlarged inset of FIG. 2. Swivel 120 preferably provides substantially unencumbered swiveling of tether 107 relative to waist belt 106. This preferred swivel feature has been found to greatly improve towing performance during use.

Preferably, the outer face 122 of waist belt 106 comprises a plurality of fixed loops 124, as shown. Preferably, each fixed loop 124 is structurally attached to waist belt 106 to facilitate the transfer of load forces between tether 107 and waist belt 106. Many users of golf-assist harness 102 find the use of two laterally opposing fixed loops 124 to be the most efficient and comfortable attachment configuration, as shown.

In preferred embodiments of the present invention, ring 126 is installed between fixed loops 124 and tether-to-belt coupler 110, as shown. Preferably, ring 126 is removable from fixed loop 124 and preferably comprises a split-type key ring of substantially rigid, preferably metallic construction. Upon reading the teachings of this specification, those of ordinary skill in the art will now understand that, under appropriate circumstances, considering such issues as intended use, cost, etc., other tether to belt coupling arrangements, such as, for example, permanent mounting, use of carabineer-type devices, use of hook-and-loop anchors, quick-release couplers, buttons with drop-loops, etc., may suffice.

Preferably, tether 107 further comprises at least one strap-length adjuster 128, more preferably two strap-length adjusters 128, each adapted to allow user adjustments to the length of tether 107. Preferably, each strap-length adjuster 128 comprises an adjustable slide device 130 adapted to receive a loop of webbing that has passed through webbing aperture 118, as shown. Upon reading the teachings of this specification, those of ordinary skill in the art will now understand that, under appropriate circumstances, considering such issues as intended use, advances in technology, etc., other length adjustment arrangements, such as, for example, hook-and-loop adjusters, buckles, ratchets, gripping cams, etc., may suffice.

Preferably, at least one, preferably three distal tether couplers 112 are engaged on tether 107, as shown. Each tether coupler 112 is preferably adapted to removably couple tether 107 to a fixed structure of golf trolley 104, most preferably structures of gripping handle 132, as best shown in FIG. 1. Most preferably, three tether couplers 112 are used to attach tether 107 to at least three points on golf trolley 104, as shown. Preferably, each tether coupler 112 is adapted to be positionally adjustable along substantially the entire length of tether 107. In this way, the tether system is substantially "self-adjusting" to maintain a relatively balanced division of tensional force between the two tether-to-belt couplers 110 at waist belt 106. Upon reading the teachings of this specification, those of ordinary skill in the art will now understand that, under appropriate circumstances, considering such issues as intended use, etc., other tether-to-trolley attachment arrangements, such as, for example, fixed position couplers, hooks, elastic coupler, etc., may suffice.

Again referring to the illustration of FIG. 1 with continued reference to FIG. 2, in preferred use, belt 106 of golf-assist harness 102 is placed in a position encircling the waist of user 103, as shown. Belt 106 preferably functions as a load distributor to distribute the load forces applied by tether 107 (along a relatively wide area of the waist portion of user 103).

As previously indicated, three tether couplers 112 of tether 107 are preferably attached to at least three points on golf trolley 104, as shown. Once attached, the user's customary walking motion allows golf trolley 104 to be comfortably towed in a trailing position, as depicted in FIG. 1. To remove golf-assist harness 102, user 103 simply detaches and removes waist belt 106 or disconnects tether 107 from waist belt 106. Preferably, the preferred flexibility of tether 107 allows the user to turn and fully access golf bag 134 without any detachment of the system.

FIG. 3 shows a front view of waist belt 106 with FIG. 4 showing a back view of waist belt 106 of golf-assist harness 102 of FIG. 1. Preferably, waist belt 106 comprises a generally flat elongated shape comprising first end 136, second end 138, outer face 122, and inner face 142, as shown. Preferably, waist belt 106 comprises a length sufficient to encircle substantially the full circumference of the waist portion of user 103, plus an additional length used in the end coupling of the belt, as described below.

Preferably, waist belt 106 comprises coupler 144 adapted to releasably couple first end 136 to second end 138. In addition, waist belt 106 is adjustable to fit user 103 comfortably by preferably utilizing belt-size adjuster 146. Preferably, belt-size adjuster 146 allows user adjustments to the circumferential size of waist belt 106. In the preferred embodiment of FIG. 3 and FIG. 4, both coupler 144 and belt-size adjuster 146 are constructed using a hook-and-loop type fastener arrangement. Preferably, such a fastener arrangement, identified herein as hook-and-loop type fastener 148, comprises at least one first mating portion 150 and at least one second mating portion 152, as shown.

Preferably, first mating portion 150 and second mating portion 152 are structured and arranged to form at least one releasable engagement. Hook and loop fastener material suitable for use in the fabrication of first mating portion 150 and second mating portion 152 include products produced under the Velcro® brand name.

Preferably, coupler 144 and belt-size adjuster 146 comprise substantially the same hook-and-loop structure thus allowing both coupling and circumferential size adjustments to be performed by a single hook-and-loop type fastener 148, as shown.

Preferably, first mating portion 150 is applied to outer face 122 of waist belt 106, as shown. Preferably, first mating portion 150 is applied to substantially the full length of waist belt 106, as shown. Preferably, first mating portion 150 is permanently joined to outer face 122 with mechanical sewing being most preferred. First mating portion 150 most preferably comprises the softer "loop-containing" portion of the hook and loop fastener material.

Preferably, a length of second mating portion 152 is applied to inner face 142, preferably located adjacent one of the ends, most preferably adjacent second end 138, as shown. Preferably, second mating portion 152 is permanently joined to inner face 142 with mechanical sewing similarly used as the preferred means for attachment. Coupling and adjustment of waist belt 106 is preferably accomplished by engaging second mating portion 152 at a user-selected position of engagement on first mating portion 150.

Figure 5:
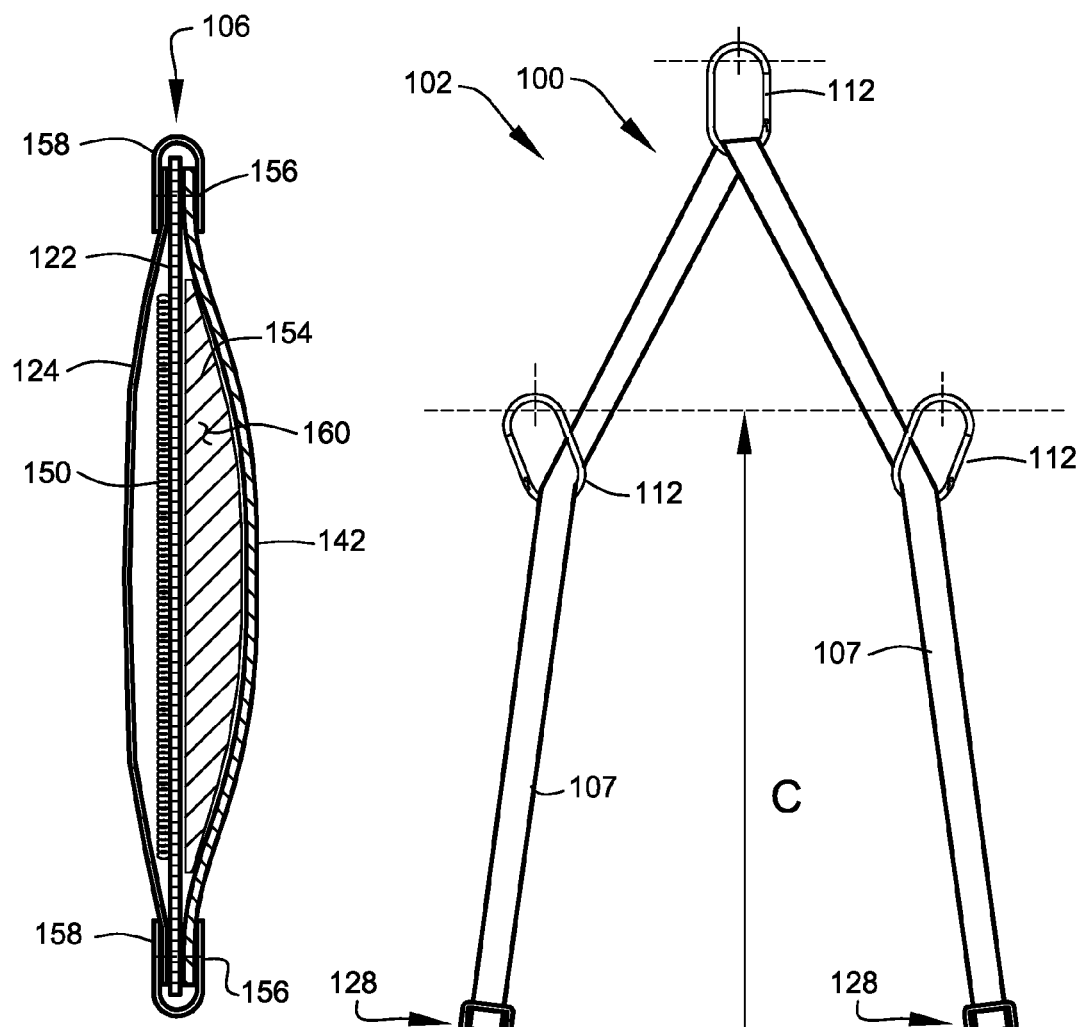
FIG. 5 shows a sectional view through the section 5-5 of FIG. 3, generally illustrating preferred internal assembly arrangements, according to the preferred embodiment of FIG. 1.

FIG. 5 shows a sectional view through the section 5-5 of FIG. 3, generally illustrating preferred internal assembly arrangements, according to the preferred embodiment of FIG. 1. Preferably, waist belt 106 is constructed from durable water-resistant outer textiles structured and arranged to form a tubular outer jacket surrounding an inner core of resilient padding 154, as shown. Preferably, outer face 122 comprises a substantially flexible sheet material, more preferably a synthetic woven fabric, most preferably a ballistic nylon.

Preferably, inner face 142 comprises a substantially flexible sheet material, more preferably a synthetic woven fabric, most preferably a moderately elastic nylon or polyester. Upon reading the teachings of this specification, those of ordinary skill in the art will now understand that, under appropriate circumstances, considering such issues as user preference, intended use, etc., other materials, such as cotton blends, Gor-Tex, Lycra, micro-twills, fleece, natural and synthetic leathers, a combination of textiles, etc., may suffice.

Preferably, inner face 142 is permanently joined to outer face 122 by a continuous perimeter seam 156, as shown. Preferably, perimeter seam 156 is reinforced against tearing and abrasion by the application of continuous peripheral piping 158, as shown. Preferably, the joining of inner face 142 to outer face 122 forms interior cavity 160, as shown. Preferably, interior cavity 160 is filled with resilient padding 154, as shown (at least embodying herein wherein such at least one inner face comprises at least one padding structured and arranged to provide padded contact adjacent the at least one waist portion of the torso of the at least one user). Preferably, resilient padding 154 comprises synthetic foam having a thickness of between about ¼ inch and about ½ inch. Upon reading the teachings of this specification, those of ordinary skill in the art will now understand that, under appropriate circumstances, considering such issues as intended use, etc., other resilient materials, such as the use of other foam polymers, synthetic gels, low-density sheets, fluid-filled bladders, natural fibers, etc., may suffice.

Referring again to the illustration of FIG. 2, golf-assist system 100 preferably comprises attachable accessory system 170, as shown. Attachable accessory system 170 preferably comprises a number of useful accessories that are attachable (and removable) from torso support 105, as shown. Attachable items comprise an extensive range of useful attachments preferably including equipment storage pockets 172, beverage holders 174, and wireless communication holsters 176, as shown. Upon reading the teachings of this specification, those of ordinary skill in the art will now understand that, under appropriate circumstances, considering such issues as intended use, advances in technology, etc., other attachable accessory arrangements, such as, for example, umbrellas-type shading devices, range finders, GPS units, anti-theft devices, video monitors and/or cameras, scorecards, ball bags, towels, pedometers, etc., may suffice.

Preferably, a panel of second mating portion 152 is applied to each attachable accessory, thus allowing the accessories to removably engage first mating portion 150 of torso support 105, as shown. Upon reading the teachings of this specification, those of ordinary skill in the art will now understand that, under appropriate circumstances, considering such issues as intended use, cost, weight of accessory, etc., other attachment arrangements, such as, for example, using a secondary belt that is attached by passing through a loop of the accessory, using snaps, hooks, clips, etc., may suffice.

Figure 6:
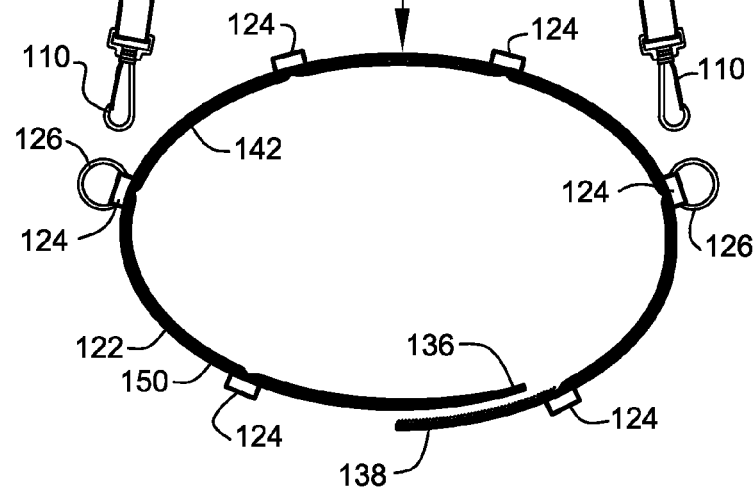
FIG. 6 shows a top view of the golf-assist harness and a preferred arrangement of tether couplers, according to the preferred embodiment of FIG. 1.

FIG. 6 shows a top view of golf-assist harness 102 including a preferred arrangement of tether couplers 112, according to the preferred embodiment of FIG. 1. Preferably, tether 107 extends in a looping fashion from a first lateral belt coupler 110 (shown detached from waist belt 106), through tether couplers 112, returning to a second lateral belt coupler 110, as shown. Preferably, strap-length adjuster 128 is used to adjust the length of tether 107, allowing the setting of the spacing between user 103 and golf trolley 104 to a distance C of about two feet. This preferred distance has been found to provide good towing performance during system use. Upon reading the teachings of this specification, those of ordinary skill in the art will now understand that, under appropriate circumstances, considering such issues as intended use, user preference, trolley design, etc., other length arrangements, such as, for example, longer tether lengths, shorter tether lengths, use of elastic tethers, etc., may suffice.

In preferred use, tether couplers 112 are attached in a generally symmetrical manner, as shown. In addition, tether couplers 112 are preferably attached to allow substantially free movement of tether 107 through tether couplers 112, as shown. This preferred mounting arrangement assists in providing relatively even loading and force transfer between golf trolley 104 and torso support 105. In addition, in preferred use, belt couplers 110 are preferably located at an elevation at least slightly higher than the highest attachment point of tether couplers 112 at golf trolley 104, as further described below.

In FIG. 1, user 103 comprises a waist height A that places belt couplers 110 at an elevation at least slightly higher than the highest attachment point of tether couplers 112 at golf trolley 104, as shown. This highly preferred arrangement assists in maintaining a stable center of gravity within golf trolley 104 (to prevent tipping). FIG. 1 clearly shows the preferred inclined orientation of tether 107 (at least embodying herein wherein, during upright walking use of such system by the at least one user, such at least one torso support is structured and arranged to position such at least one proximal removable coupler at a first elevation within at least one elevational range; the highest point of coupling between such at least one removable tether coupler and such at least one wheeled golf trolley comprises a second elevation; and such first elevation is at least greater than such second elevation).

Figure 7:
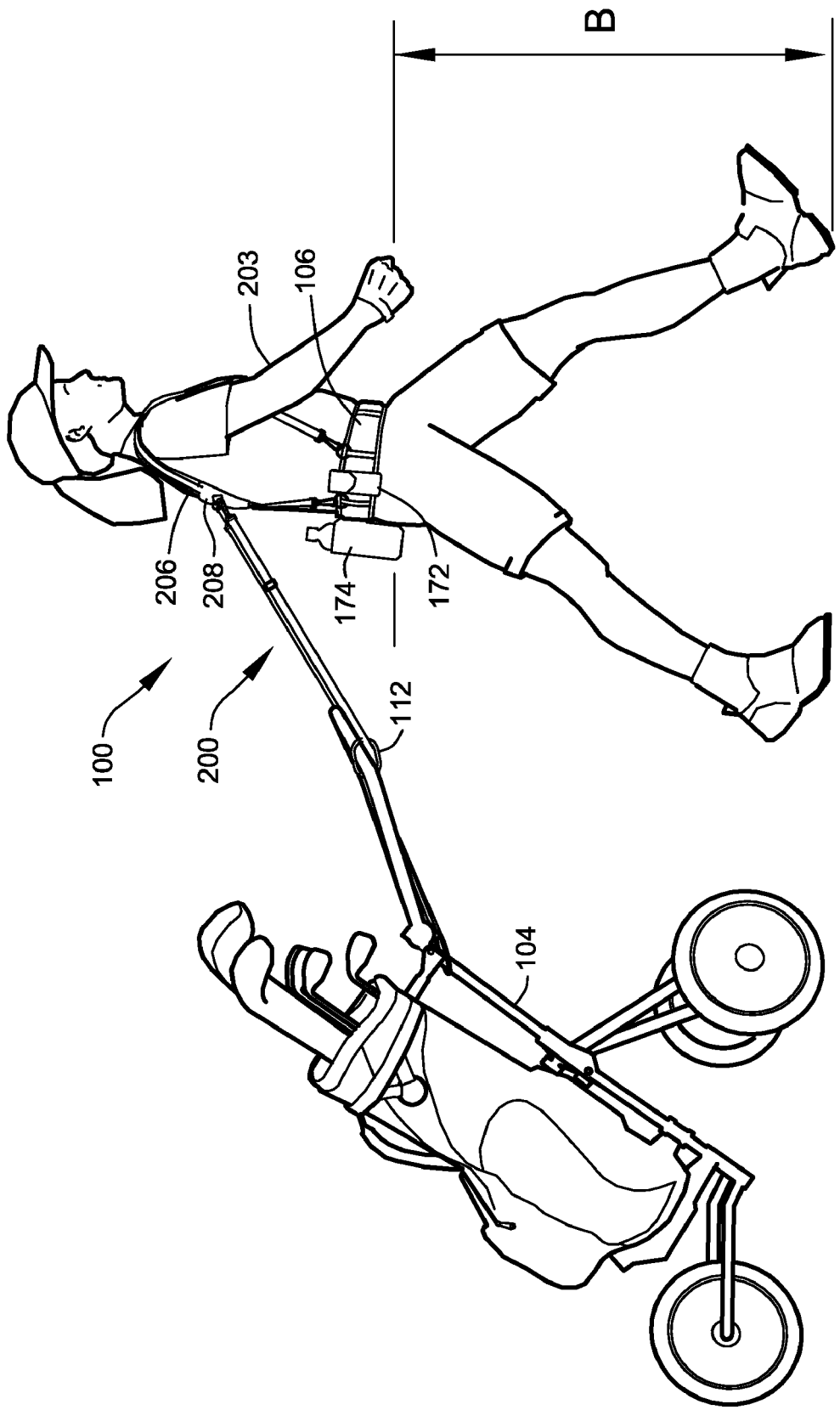
FIG. 7 shows a second perspective view illustrating a golfer pulling a golf trolley using an alternate golf-assist harness of the golf-assist system according to another preferred embodiment of the present invention.

FIG. 7 shows a second perspective view illustrating a small framed user 203 pulling golf trolley 104 using alternate golf-assist harness 200 of the golf-assist system 100 according to another preferred embodiment of the present invention. The waist height B of user 203 falls at an elevation below the highest attachment point of tether couplers 112. Attachment of tether 107 to waist belt 106 would therefore be less than ideal for its tendency to add a rotational force that, under some circumstances, could result in tipping of the trolley. To achieve preferred lines of force between user 203 and golf trolley 104, alternate golf-assist harness 200 comprises a higher tether attachment point, as shown. This preferred attachment point (identified herein as attachment point 300) is achieved by the addition of shoulder harness assembly 206 to torso support 105, as shown. Preferably, shoulder harness assembly 206 comprises an elevated back plate 208 to which tether 107 is attachable, as shown. In addition, shoulder harness assembly 206 is further adapted to distribute a portion of the force-generated load of the tether along an upper shoulder portion of the torso of user 203, as shown (at least embodying herein the at least one tensional force transferred by such at least one tether is applied to such at least one torso support substantially at such at least one proximal removable coupler of such at least one shoulder strap). FIG. 7 clearly shows the preferred inclined orientation of tether 107 provided by the unique attachment arrangements of alternate golf-assist harness 200.

Figure 9:
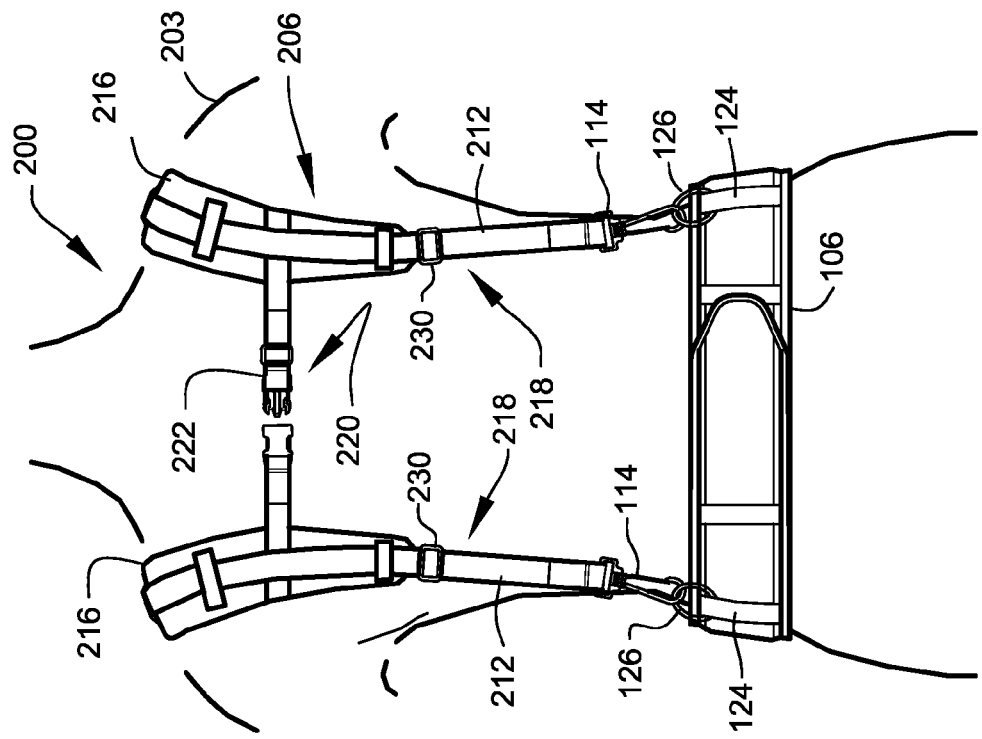
FIG. 9 shows a front view, illustrating the alternate golf-assist harness according to the preferred embodiment of FIG. 7.
Figure 8:
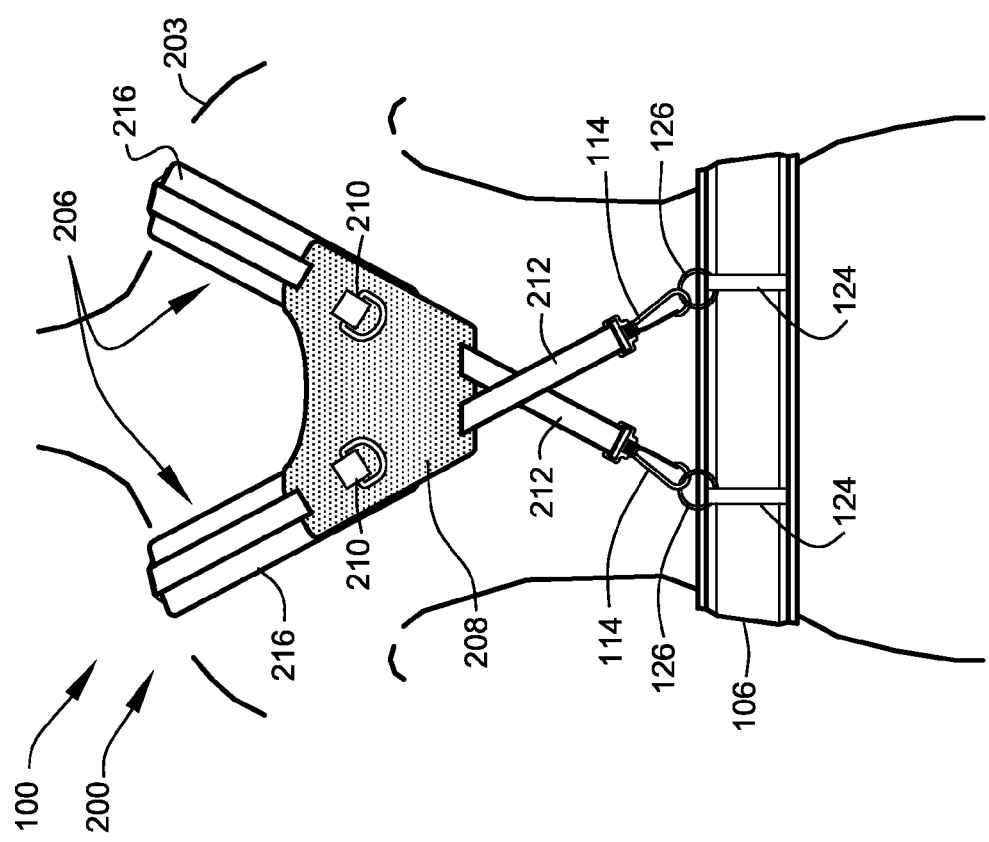
FIG. 8 shows a rear view, illustrating the alternate golf-assist harness adjacent the torso of a user, according to the preferred embodiment of FIG. 7.

FIG. 8 shows a rear view, illustrating alternate golf-assist harness 200 adjacent the torso of user 203, according to the preferred embodiment of FIG. 7. FIG. 9 shows a front view, illustrating alternate golf-assist harness 200 according to the preferred embodiment of FIG. 7.

Preferably, back plate 208 of shoulder harness assembly 206 comprises a set of attachment points 210 adapted to provide proximal connection points for belt couplers 110, as shown in FIG. 7 (at least embodying herein such at least one shoulder strap comprises such at least one proximal removable coupler). Preferably, back plate 208 is located adjacent the center median line of the back of user 203, as shown. Preferably, shoulder harness 206 is substantially bilaterally symmetrical in arrangement, as shown.

Preferably, shoulder harness assembly 206 comprises a pair of shoulder straps 212 that preferably extend from waist belt 106, over the shoulders of user 203, preferably returning to waist belt 106, as shown. Each shoulder strap 212 preferably comprises a length of webbing, most preferably flat nylon webbing exhibiting limited elongation under load, as shown. Preferably, each end of each shoulder strap 212 comprises a coupler adapted to couple the end of shoulder strap 212 to a fixed loop 124 of waist belt 106, as shown. For user convenience, this coupler preferably comprises a snap hook 114 having a gated hook portion permanently coupled to a webbing aperture by a swivel, as shown (at least embodying herein wherein such at least one shoulder strap comprises at least one removable harness-coupler structured and arranged to removably couple to such at least one encircling belt). A ring 126 is preferably used between snap hook 114 and fixed loop 124, as shown.

Preferably, each shoulder strap 212 crosses the back of user 203, in a "bandoleer" arrangement, and is threadably engaged on back plate 208, as shown. Shoulder padding 216 is preferably applied to each shoulder strap 212 as the strap crosses over the upper torso of user 203, as shown. The construction of shoulder padding 216 is substantially similar to that of waist belt 106. Each shoulder strap 212 preferably comprises length adjuster 218 adapted to allow the length of the straps to be adjusted to match the torso length of user 203. Preferably, length adjuster 218 comprises an adjustable slide device 230 adapted to receive a loop of webbing that has passed through the webbing aperture of snap hook 114, as shown. Upon reading the teachings of this specification, those of ordinary skill in the art will now understand that, under appropriate circumstances, considering such issues as intended use, advances in technology, etc., other length adjustment arrangements, such as, for example, hook-and-loop adjusters, buckles, ratchets, gripping cams, etc., may suffice.

Preferred embodiments of alternate golf-assist harness 200 further comprise an optional shoulder harness stabilizer 220 adapted to assist in stabilizing the positions of the shoulder straps 212 during use, as shown. Shoulder harness stabilizer 220 preferably comprises a length of horizontal webbing extending across the upper chest of user 203 between the two shoulder straps 212, as shown. Preferably, shoulder harness stabilizer 220 is separable at a two-part connector 222, preferably a user releasable buckle, as shown. A buckle suitable for use as two-part connector 222 preferably comprises a side-release buckle assembly as manufactured by National Molding of Farmingdale N.Y.

Figure 10:
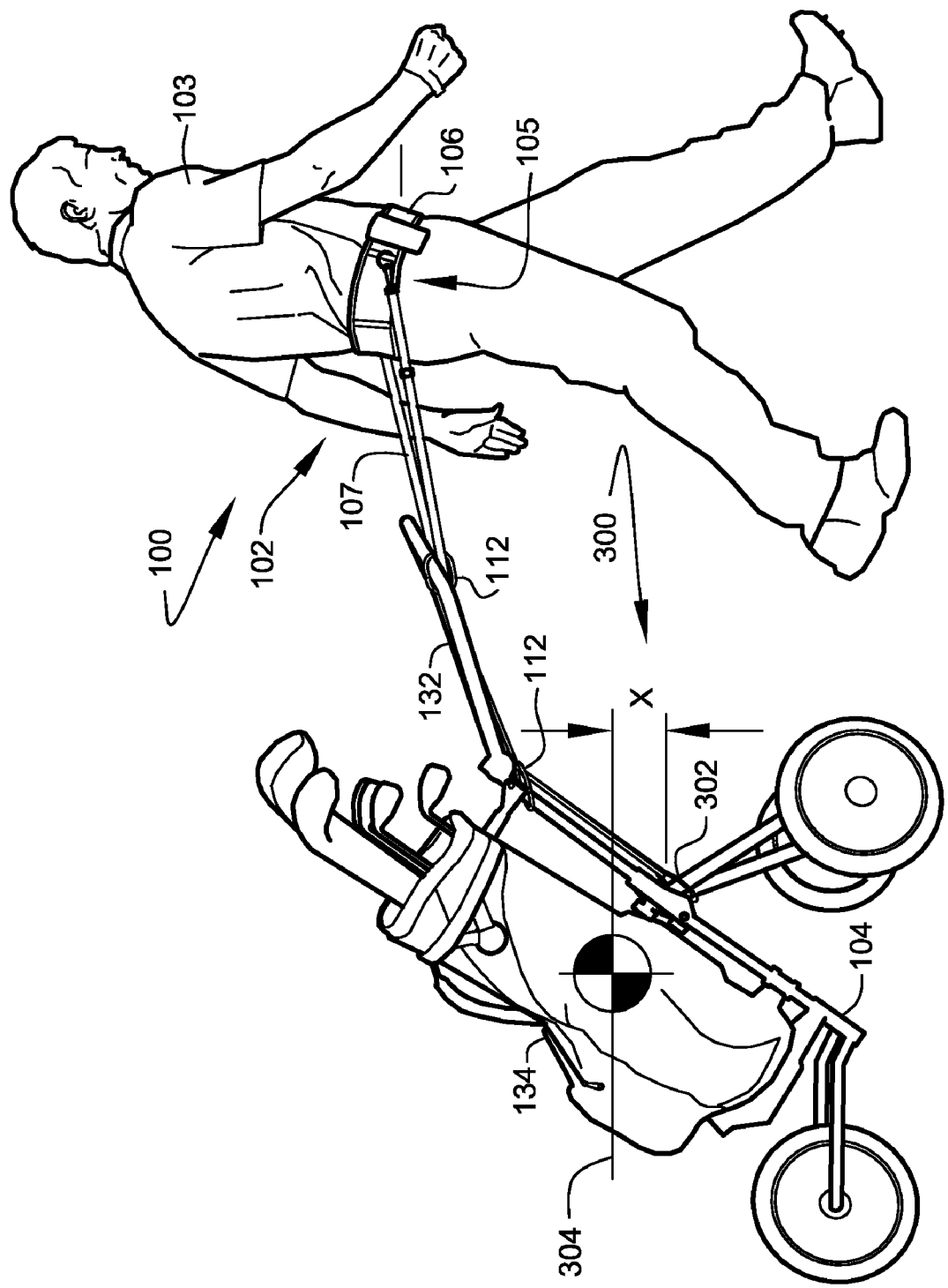
FIG. 10 shows a perspective view illustrating a golfer pulling a golf trolley using an alternate preferred mounting method of the golf-assist harness, according to a preferred method of the present invention.

FIG. 10 shows a perspective view illustrating user 103 pulling golf trolley 104 using alternate preferred mounting method 300 of golf-assist harness 102, according to a preferred method of the present invention.

Alternate preferred mounting method 300 is preferably enabled by the coupling of tether 107 (embodying herein a flexible load transfer member) to at least one relatively low attachment point on golf trolley 104, most preferably at least one attachment point 302 located a distance X below the center of gravity 304 of golf trolley 104, as shown. Preferably, distance X comprises a measured value at least greater than 0, as shown. The preferred orientation of attachment point 302, relative to center of gravity 304, is preferably established with golf trolley 104 oriented in a customary rolling position, as shown. Preferably, tether couplers 112 are used, as shown, to removably couple tether 107 to fixed structures of golf trolley 104, most preferably structures of gripping handle 132, as shown. Applicant has determined that alternate preferred mounting method 300 is beneficial in increasing stability during rolling and improves overall towing performance during use.

Upon reading the teachings of this specification, those with ordinary skill in the art will now understand that, under appropriate circumstances, considering issues such as user preference, type of cart to be towed, intended use, market demand, production cost, etc., other body strap arrangements, such as, for example, other body strap shapes, body strap configurations, body strap locations, yoke configurations using three straps, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system related to towing at least one golf bag adapted to hold golf equipment comprising at least one golf club using the torso of at least one user, said system comprising:
   a) at least one three-wheeled golf trolley structured and arranged to assist wheeled transport of the at least one golf bag;
   b) at least one torso support structured and arranged to support at least one force-generated load on the torso of the at least one user;
   c) at least one tether structured and arranged to transfer at least one tensional force between said at least one three-wheeled golf trolley and said at least one torso support;
   d) two proximal removable couplers, one located at each end of said at least one tether, wherein the proximal removable couplers removably couple said at least one tether to two points on said at least one torso support;
   e) three removable tether couplers structured and arranged to removably couple said tether to three points on said at least one three-wheeled golf trolley, wherein at least two of the three points are located at the gripping handle of the at least one three-wheeled golf trolley, wherein each one of said at least three removable tether couplers is structured and arranged to be freely moveable along the entire length of said at least one tether
   f) wherein said at least one torso support comprises at least one load distributor structured and arranged to distribute the at least one force-generated load along at least one waist portion of the torso of the at least one user; and
   g) wherein said at least one tether is sufficiently flexible to limit substantially all transfers of compressive loads between said at least one three-wheeled golf trolley and said at least one torso support.

2. The system according to claim 1 wherein said three removable tether couplers comprise carabiner-type devices.

3. The system according to claim 1 wherein said at least one tether comprises:
   a) at least one substantially flexible strap;
   b) wherein said at least one substantially flexible strap comprises:
      i) at least one length, and
      ii) at least one strap-length adjuster structured and arranged to adjust said at least one length;
   c) wherein said at least one strap-length adjuster is adjustable by the at least one user.

4. The system according to claim 1 wherein said two proximal removable couplers each comprises a swivel structured and arranged to provide substantially unencumbered swiveling of said at least one tether relative to said at least one torso support.

5. The system according to claim 1 wherein:
   a) during upright walking use of said system by the at least one user, said at least one torso support is structured and arranged to position said two proximal removable couplers at a first elevation within at least one elevational range;
   b) the highest point of the coupling between said three removable tether couplers and said at least one three-wheeled golf trolley comprises a second elevation;
   c) said first elevation is higher than said second elevation.

6. The system according to claim 1 further comprising at least on attachable accessory structure and arranged to removably attach to said at least one torso support.

7. The system according to claim 6 wherein:
   a) both said at least one torso support and said at least one attachable accessory comprise at least one hook-and-loop type fastener;
   b) said at least one hook-and-loop type fastener comprises at least one first mating portion and at least one second mating portion;
   c) said at least one torso support comprises at least one first mating portion;
   d) said at least one attachable accessory comprises at least one second mating portion; and
   e) said at least one first mating portion and said at least one second mating portion are structured and arranged to form at least one releasable engagement.

8. The system according to claim 6 wherein said at least one attachable accessory comprises at least one beverage holder.

9. The system according to claim 1 wherein said at least one load distributor comprises at least one encircling belt structured and arranged to encircle substantially a full circumference of the at least one waist portion of the torso of the at least one user.

10. The system according to claim 9 wherein said at least one encircling belt comprises:
    a) at least one first end;
    b) at least one second end;
    c) at least one outer face;
    d) at least one inner face; and
    e) at least one coupler structured and arranged to releasably couple said at least on first end to said at least one second end.

11. The system according to claim 10 wherein said at least one outer face comprises at least one fixed loop structured and arranged to receive and firmly retain one of said two proximal removable couplers.

12. The system according to claim 10 wherein said at least one inner face comprises at least one padding structured and arranged to provide padded contact adjacent the at least one waist portion of the torso of the at least one user.

13. The system according to claim 10 wherein said at least one load distributor comprises at least one shoulder strap structured and arranged to further distribute the at least one force-generated load along at least one shoulder portions of the torso of the at least one user.

14. The system according to claim 13 wherein said at least one shoulder strap comprises at least one removable harness coupler structured and arranged to removably couple said at least one shoulder strap to said at least one encircling belt.

15. The system according to claim 13 wherein:
    a) said at least one shoulder strap is structured and arranged to removably couple with said two proximal removable couplers; and
    b) the at least one tensional force transferred by said at least one tether is applied substantially to said at least one shoulder strap of said at least one torso support.

16. The system according to claim 10 wherein said at least one encircling belt comprises at least one belt-size adjuster structured and arranged to adjust the circumferential size of said at least one encircling belt.

17. The system according to claim 16 wherein:
    a) both said at least one couplers and said at least one belt-size adjuster each comprises at least one hook-and-loop type fastener;
    b) said at least one hook-and-loop type fastener comprises at least one first mating portion and at least one second mating portion; and c) said at least one first mating portion and said at least one second mating portion are structured and arranged to form at least one releasable engagement.

18. The system according to claim 17 wherein:
a) said at least one outer face comprises said at least one first mating portion;
b) said at least one inner face comprises said at least one second mating portion;
c) said at least one second mating portion is positioned substantially adjacent at least one of said at least one first end and said at least one second end.

19. The system according to claim 17 wherein said at least one first mating portion extends along substantially the entire length of said at least one outer face.

* * * * *